United States Patent
Wolf et al.

(10) Patent No.: US 6,468,132 B2
(45) Date of Patent: Oct. 22, 2002

(54) GRINDING ARRANGEMENT

(75) Inventors: Helmut Wolf, Zweibrucken; Henrik Nieschulze, Wieren, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/910,514

(22) Filed: Jul. 19, 2001

(65) Prior Publication Data

US 2002/0009964 A1 Jan. 24, 2002

(30) Foreign Application Priority Data

Jul. 22, 2000 (DE) .......................................... 100 35 742

(51) Int. Cl.[7] ............................................... B24B 49/00
(52) U.S. Cl. ........................... 451/10; 451/11; 451/164; 451/319
(58) Field of Search ................................. 451/9, 10, 11, 451/45, 164–172, 321, 319, 419, 423, 372

(56) References Cited

U.S. PATENT DOCUMENTS 4,557,074 A * 12/1985 Elsner et al.
4,843,767 A    7/1989 Johnson

* cited by examiner

*Primary Examiner*—Eileen P. Morgan

(57) ABSTRACT

A grinding arrangement for grinding knives of a chopper drum of a forage harvester includes a movement arrangement for effecting movement of a grinding stone over the length of each of the knives, where individual locations of the knives can be associated with differing grinding times in order that the knives be ground to produce a desired cylindrical profile. A control for the movement arrangement may include either a sensor for determining the need for grinding a given knife at a precise location along the knife and the grinding time required for achieving a desired profile, or predetermined information stored in memory which operates to automatically cause a certain amount of grinding time to elapse in accordance with a specific axial position of the grinding stone.

5 Claims, 5 Drawing Sheets

GRINDING ARRANGEMENT

FIELD OF THE INVENTION

The invention concerns a grinding assembly or arrangement for a rotary cutterhead or chopper arrangement, the grinding assembly including a grinding stone for the grinding of the knives of the cutterhead or chopper arrangement, and a stone positioning apparatus or stone moving arrangement for effecting movement of the grinding stone over the width of the cutterhead, where individual locations of the knives can be associated with differing grinding times.

BACKGROUND OF THE INVENTION

U.S. Pat. No. 4,843,767 describes a grinding arrangement for a chopper arrangement, in which the grinding stone traverses the width of the chopper drum back and forth with constant velocity. At each of the reversal points at the left and the right end of the chopper drum, the grinding stone remains stopped for a dwell time so that at that location the knives of the chopper drum are ground over an interval of time that is longer than the grinding time that is associated with the parts of the knives located between the reversal points.

During the operation of a forage harvester, the knives fastened to the chopper drum wear over time. While the knives around the circumference of any given location along the width of the chopper drum, as a rule, wear approximately at a uniform rate, the wear across various locations along the width of the chopper drum may vary considerably. Hence the diameter of the enveloping cylinder described by the cutting edges of the knives can vary across the width of the chopper drum. A cylindrical or slightly concave shape of the entire enveloping cylinder is desired in order to simplify an automatic adjustment of the shear bar or to make this possible in the first place, depending on the adjustment system. A parallel and exact in-feed of the shear bar towards the circumference of the chopper drum is indispensable for an effective chopping process.

With known grinding arrangements no possibilities are provided to equalize automatically the deviations from the cylindrical shape of the chopper drum during the grinding process.

SUMMARY OF THE INVENTION

According to the present invention, there is provided an improved grinding assembly or arrangement for grinding the knives of the cutterhead or chopper drum of a forage harvester.

An object of the invention is to provide a grinding assembly or arrangement including a stone positioning or moving apparatus having a control for controlling the movement of the grinding stone of the grinding assembly or arrangement relative to a cutterhead in such a way that the amount of time the grinding stone occupies any one location along the width of the cutterhead may be selectively varied.

A more specific object of the invention is to provide an arrangement for controlling the movement of a grinding stone by selecting the path and time characteristic of the movement of the grinding stone as desired so that the grinding stone dwells for a longer time at certain locations along the width of the cutterhead, where the knife edges are worn very little, than at other locations along the width of the cutterhead where the knife edges are worn relatively heavily.

Yet a more specific object of the invention is to provide an arrangement for controlling the movement of a grinding stone by establishing, and storing in memory in advance, grinding times based on empirical values (as result of tests) or values determined by experience, and by storing a desired target shape of the cutting edges of the knives.

These and other objects of the invention will become apparent from a reading of the ensuing description together with the appended drawings.

DESCRIPTION OF THE PREFERRED EMBODIMENT

FIGS. 1a–1d will be described below in conjunction with the description of the operation of the grinding arrangement.

Figure 2:
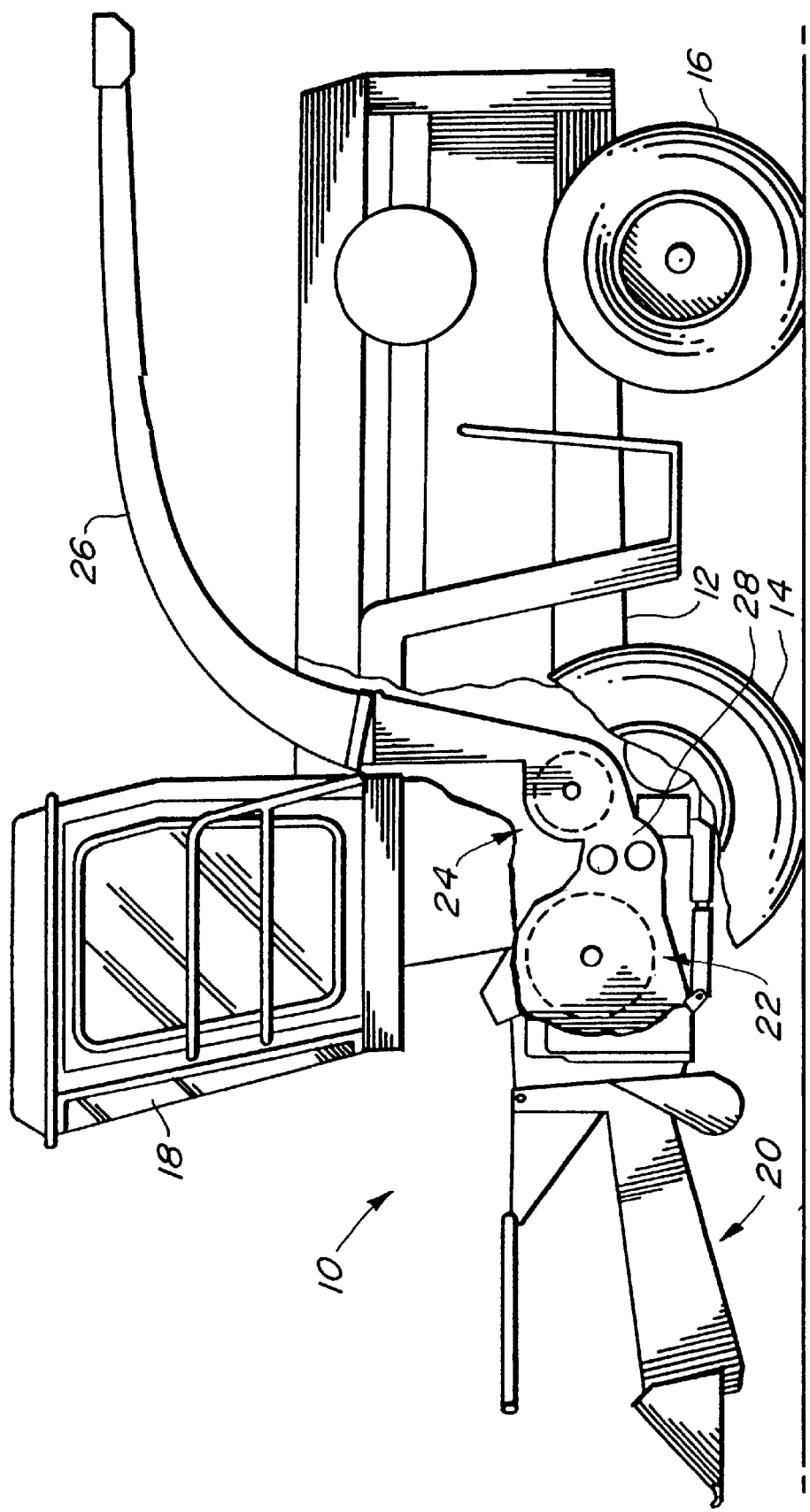
FIG. 2 is a schematic left side view of a harvesting machine with a chopper drum with which a grinding arrangement constructed in accordance with the present invention is particularly adapted for use.

The harvesting machine 10, shown in FIG. 2 in the form of a self-propelled forage harvester, is supported on a frame 12, that is carried by front and rear wheels 14 and 16. The harvesting machine 10 is operated from an operator's cab 18 from which a crop recovery arrangement 20 can be viewed and controlled. Crop taken up from the ground by the crop recovery arrangement 20, for example, corn, grass or the like, is conducted to a chopper drum 22 that chops it into small pieces and delivers it to a conveyor arrangement 24. The crop leaves the harvesting machine 10 to an accompanying trailer over a discharge duct 26, that is mounted for rotating about an upright axis. Between the chopper drum 22 and the conveyor arrangement 24, a post-chopper reduction arrangement 28 is provided for use during the harvesting of corn, the arrangement 28 operating to conduct the crop tangentially to the conveyor arrangement 24.

Figure 3:
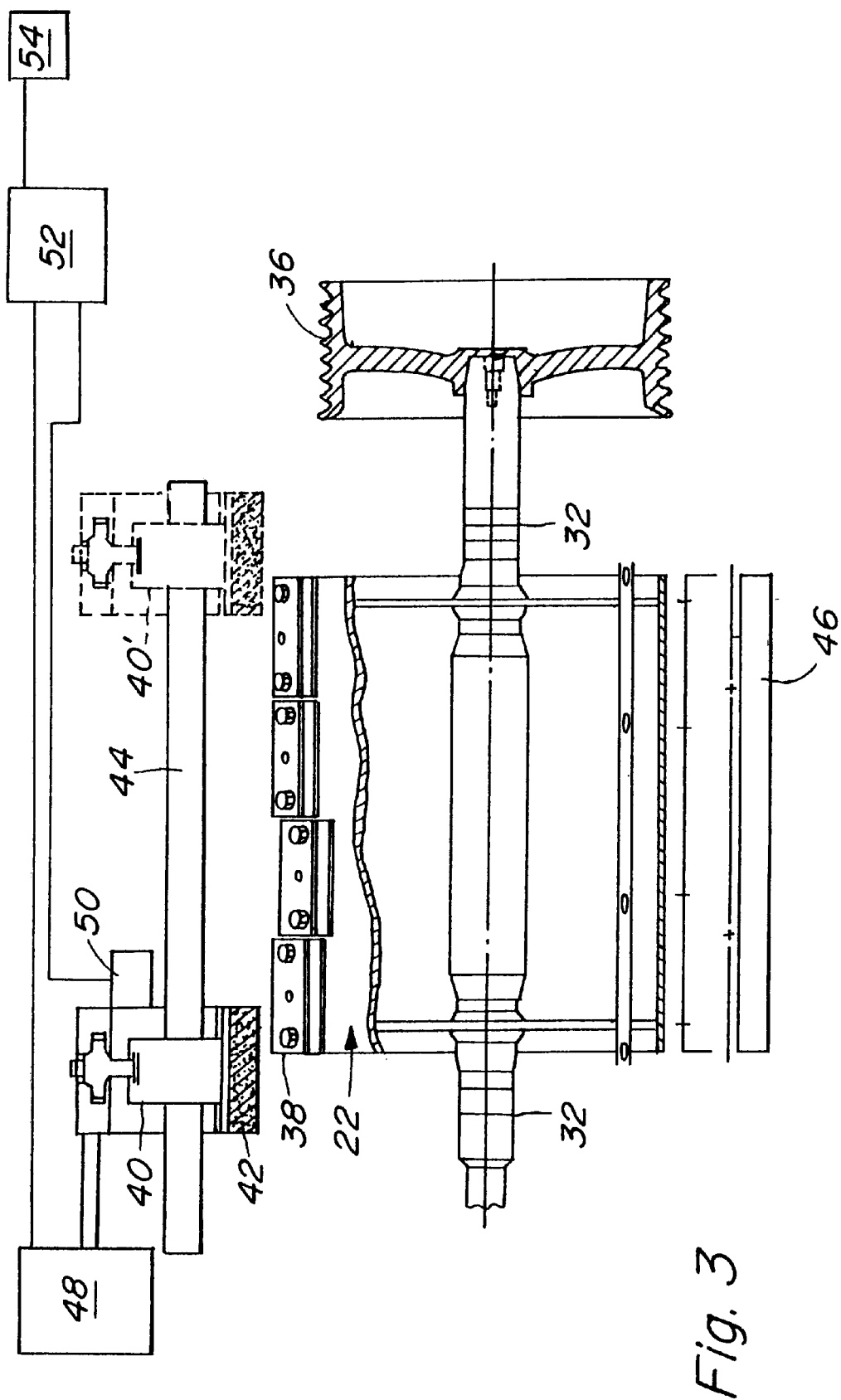
FIG. 3 is a front view of a first embodiment of a grinding arrangement.

FIG. 3 shows a schematic view of a cutterhead or chopper drum 22 and a grinding assembly or arrangement associated with it, as can be seen by a look at the harvesting machine 10 in FIG. 2 from the front, with regard to the direction of forward travel. The chopper drum 22 is provided with a number of knives 38 distributed over its width and its circumference that chop crop taken up by the crop recovery arrangement 20 in interaction with a rigid shear bar 46. The chopper drum 22 includes a central shaft 32 that can be driven in rotation through a belt pulley 36 at its end face and belts, not shown, by a motor of the harvesting machine 10. The shaft 32 is supported through two bearings arranged respectively on each side of the chopper drum 22, not shown in FIG. 3, on the frame 12 of the harvesting machine 10.

In order to be able to sharpen the knives 38 after a certain operating time, without having to disassemble the individual knives 38 or the entire chopper drum 22, the grinding assembly or arrangement is provided above the chopper drum 22 close to the enveloping cylinder described by the knives 38, and includes a grinding stone 42, a grinding stone retainer 40 associated with the grinding stone and an axle 44, on which the grinding stone retainer 40 is supported in bearings so that it can be slid.

If the knives 38 are to be sharpened, the chopper drum 22 is brought into rotation, as a rule in the reverse direction of rotation and/or with reduced rotational speed, compared to normal chopper operation. The grinding stone retainer 40, with the grinding stone 42 attached thereto, is slid by means of a stone positioning apparatus or stone movement arrangement 48 out of a rest or park position, not shown, in which it is arranged alongside the chopper drum 22, over the entire width of the chopper drum 22. At that time, the underside of the grinding stone 42 is in contact with the knives 38, and sharpens these. During the grinding process, the grinding stone 42 traverses the width of the chopper drum 22 several times. The end or reversal points of this sliding movement are shown in FIG. 3 by the grinding stone retainer with the number call-outs 40, at the left reversal point, and 40', at the right reversal point.

Between the sliding movements, an in-feed of the grinding stone 42 can be performed, that is, a minute movement of the grinding stone 42 towards the knives 38. In the embodiment shown, a mechanical element, for example a ratchet gear, is used for this purpose which interacts with a stationary element upon reaching one or both reversal points of the grinding stone retainer 40. The rotation of the mechanical element is converted by means of a threaded component into a sliding movement so that the grinding stone 42 is fed-in towards the chopper drum 22. By a movement of the grinding stone 42 only through a limited sliding region towards the side, an in-feeding can be avoided, since the mechanical element then does not come into contact with the stationary element. A grinding process of this type without in-feeding is appropriate for the planing at the conclusion of the grinding process. The stone positioning apparatus or movement arrangement 48 of the grinding assembly or arrangement is controlled by a position controller 52, shown schematically in FIG. 3, which controls the sliding of the grinding stone 42 along the axle 44 by means of the positioning apparatus 48 as well as the in-feeding, in the manner described above. The stone positioning apparatus controller 52 is supplied with information about the immediate position of the grinding stone 42 which can be performed by a corresponding sensor, not shown in the drawing, for example, a linear potentiometer which is integrated into a motor of the stone positioning apparatus 48, or by the positioning apparatus controller 52 having available information into which position it has brought the stone positioning apparatus 48. For this purpose, for example, the number of impulses that have been transmitted to a stepper motor of the stone positioning apparatus 48 can be stored in memory. Furthermore, the stone positioning apparatus controller 52 can also control the drive of the chopper drum 22.

It should be noted that the in-feeding can be performed by a separate motor, in particular an electric or hydraulic motor that would also have to be connected with the stone positioning apparatus controller 52. In place of an in-feeding by shifting the grinding stone 42, the entire grinding stone retainer 40 could be in-fed instead.

Figure 4:
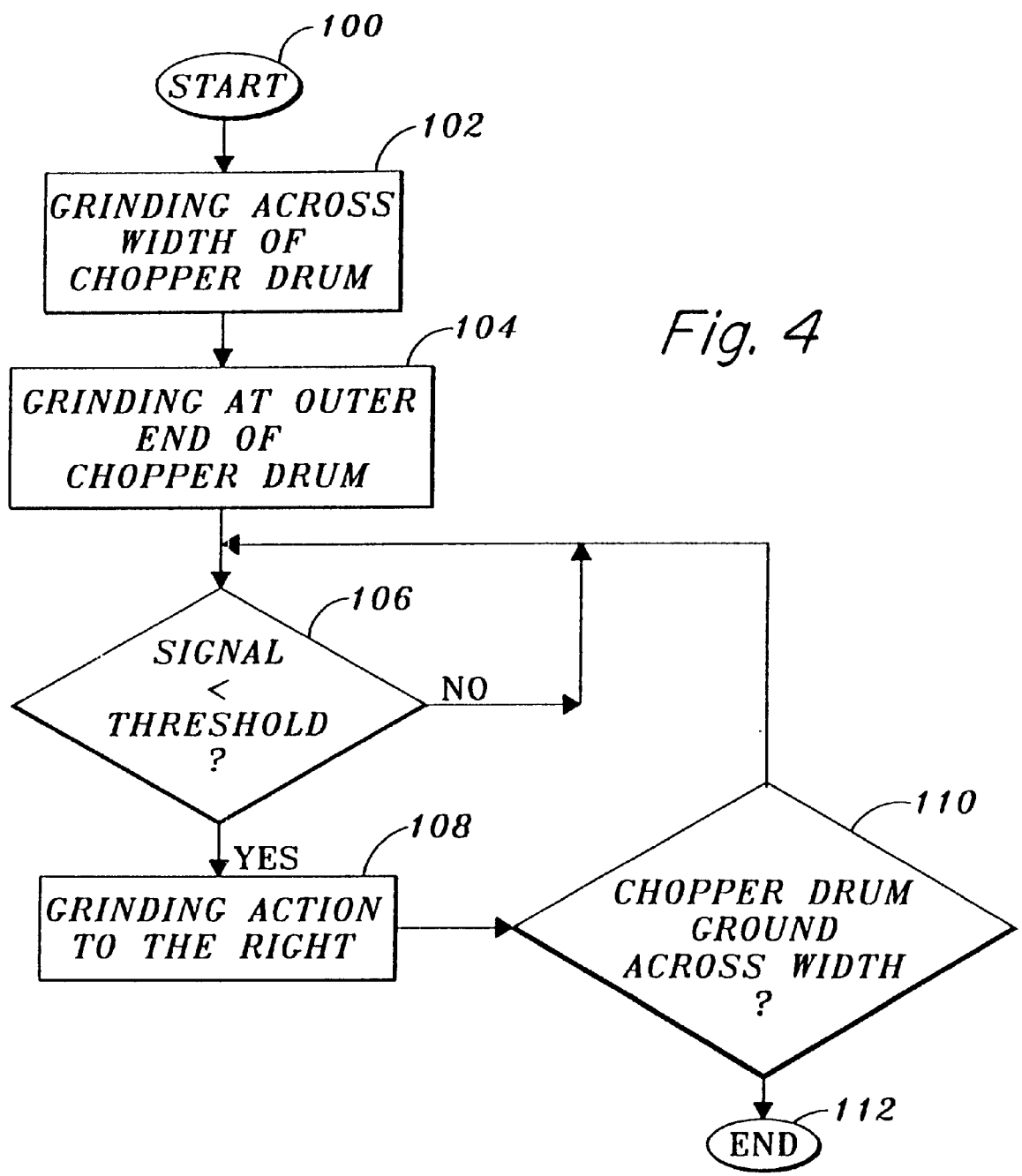
FIG. 4 is a flow diagram that illustrates a grinding process.

The stone positioning apparatus controller 52 is connected with a memory 54 and a knock sensor 50 attached to the grinding stone retainer 40, used as a measurement arrangement. A grinding process, as illustrated in FIG. 4, takes its course as follows:

After the beginning of the grinding process step 100, the stone positioning apparatus controller 52 initially causes the grinding stone 42 in step 102 to be moved by the stone positioning apparatus 48 to traverse the width of the chopper drum 22 and return again into the initial position. Here the grinding stone 42 can remain in the position relative to the grinding stone retainer 40 in which it was brought during the preceding grinding process, or, if necessary, in contrast thereto, in-fed towards the chopper drum 22. Step 102 can be used to determine whether an in-feeding of the grinding stone 42 is necessary. That is the case if no signal, or only a very minute signal, is generated by the knock sensor 50 in at least one location along the width of the chopper drum 22. In this case, there is a dent, depression or the like in the knives 38 that cannot be equalized without in-feeding.

During the traversing of the width of the chopper drum 22, the knock sensor 50 attached to the grinding stone retainer 40 generates a signal that is a function of the spacing of the cutting edges of the knives 38 from the grinding stone 42. The control arrangement 52 is supplied over an appropriate analog/digital converter with information about the amplitude of this signal.

Figure 1A:
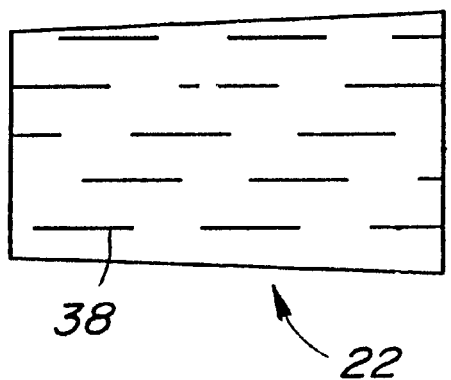
FIGS. 1a–1d are schematic views of chopper drums with knives worn to produce different drum profiles.
Figure 1B:
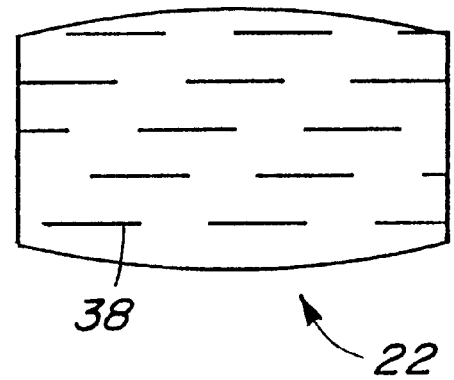
Figure 1C:
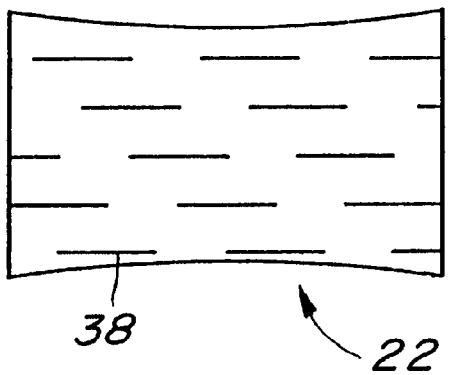
Figure 1D:
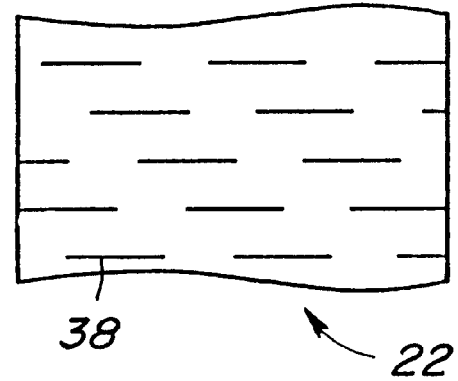

With a chopper drum that has the shape shown in FIG. 1a, a signal characterized in the following as a spacing signal, which contains information about the spacing, would decrease from left to right, with the amplitude of the signal transmitted by the knock sensor 50 increasing. In the case of the chopper drum 22 shown in FIG. 1b, that can be the result of the crop supplied or excessive dwell time at the ends of the shifting movement of the grinding stone 42 across the width of the chopper drum 22, so that the knives 38 are more heavily worn there, the spacing signal would continually decrease the closer the grinding stone 42 approaches the center of the chopper drum 22. If the shape is the result of long dwell times at the ends of the chopper drum 22, so that it can be recognized by the stone positioning apparatus controller 52 during grinding, the dwell times stored in the memory 54 can be shortened automatically. The shape of the chopper drum 22 shown in FIG. 1c results in the largest spacing in the center, and, with the shape shown in FIG. 1d, results in a spacing varying irregularly over the width. The shape in FIG. 1c can be the result of dwell times at the end of the chopper drum 22 that are too short. If this is recognized by the stone positioning apparatus controller 52 during grinding, the dwell times stored in the memory 54 can be extended automatically. However, the shapes illustrated in FIGS. 1c and 1d can also be the result of non-uniform supply of crop or a defective shear bar 46.

In the grinding process shown in FIG. 4, the grinding stone 42 is initially not in-fed further. In step 104 the grinding stone 42 is brought into a first position at the chopper drum by the stone positioning apparatus 48, which, as a rule is adjacent to the park position and is located at the left or right outside. It remains in this position until the knock sensor 50 generates an output signal that corresponds to a desired spacing between the shaft 32 and the cutting edges of the knives 38 so that an adequate sharpness of the components of the knives 38 interacting with the grinding stone 42 is attained. Therefore, step 106 poses the question whether the signal of the knock sensor 50 is smaller than a threshold value. If the result is "No", step 106 follows, otherwise step 108. There the grinding stone 42 is transported by the stone positioning apparatus 48 through a distance corresponding to its width further to the left or the right and grinds the knives 38 there. Step 110 follows in which the question is posed, whether the chopper drum 22 has already been processed over its entire width. If "No", step 106 follows, otherwise the process is ended in step 112. Therefore the grinding stone 42 always remains standing at one location along the width of the chopper drum 22, until the knock sensor 50, in each case, transmits the desired output signal. These processes are repeated until the entire width of the chopper drum 22 has been processed. In this way, the result is that with varying grinding times across the width of the chopper drum 22, the chopper drum 22 is brought into a cylindrical shape. Upon a traversing of the width of the chopper drum 22 with the grinding stone 42, the output signal of the knock sensor 50 would now be constant. In case the chopper drum 22 is found to have a particularly small radius at a few locations, so that the knock sensor 50 cannot detect any contact between the knives 38 and the grinding stone 42, an in-feeding of the grinding stone 42 and a repetition of the grinding process over the entire width of the chopper drum 22 can be performed. As a rule, the process described is repeated with reversed direction of movement of the grinding stone 42 and/or performed several times. To conclude the grinding process, a normal grinding and/or planing for the entire chopper drum 22 can be performed in a manner known in itself. Finally, the grinding stone 42 is brought into its park position.

Figure 5:
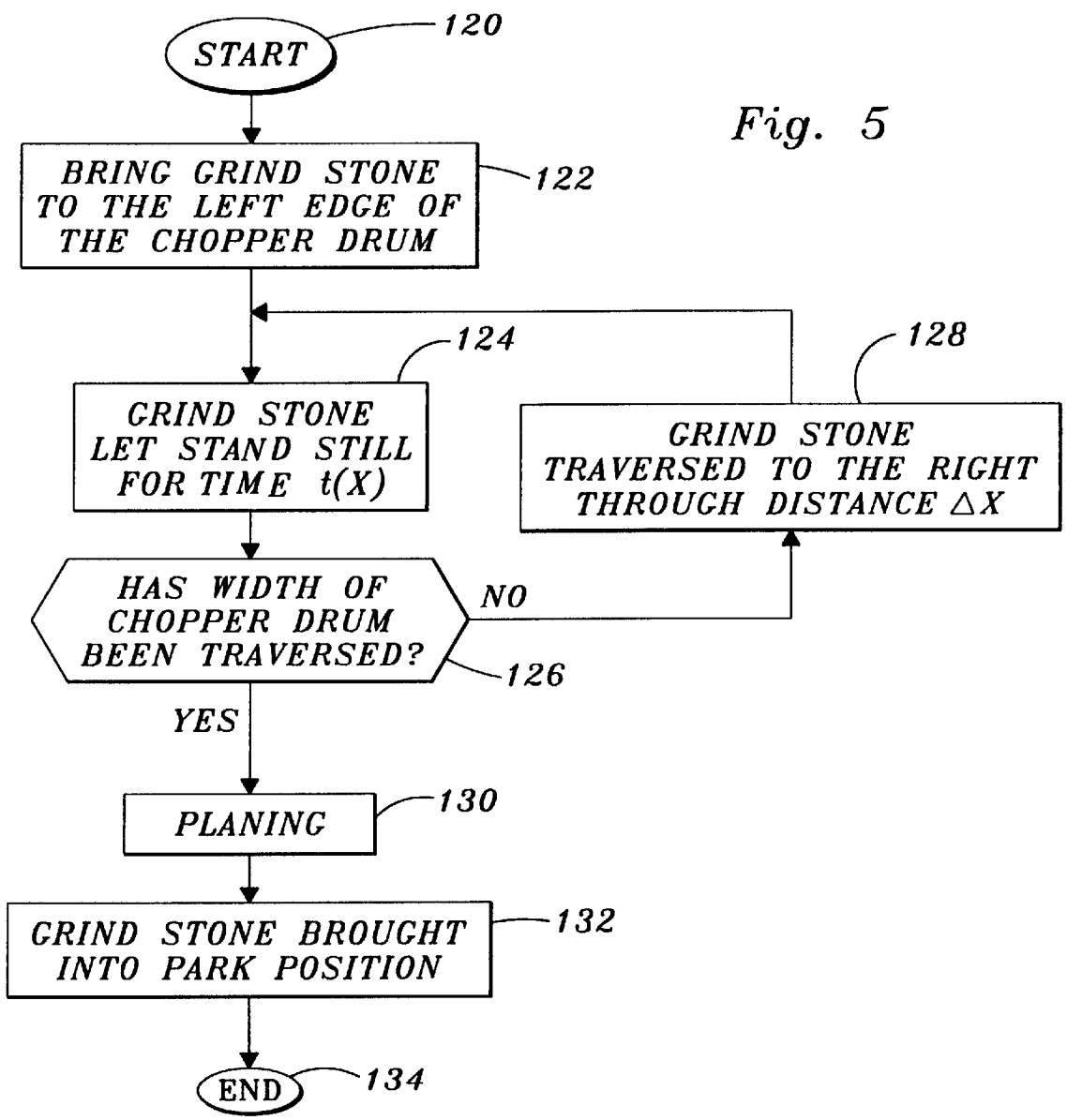
FIG. 5 is a flow diagram that illustrates another grinding process.

FIG. 5 shows a time-sequence diagram for the control of the grinding process 42 in which the grinding times varying over the width of the knives 38 are stored in memory ahead of time. Thereby the sensor 50 shown in FIG. 3 can be omitted. In the grinding process according to FIG. 5, after the start in step 120, the grinding stone 42 is brought out of the park position at the left edge of the chopper drum 22 by the stone positioning apparatus 48. Step 124 follows, according to which the grinding stone 42 remains standing for a period t(x) that is a function of its immediate position x. The time intervals t(x) are stored in memory 54 in the form of a table, list, mathematical function or the like. Step 126 follows in which the question is posed whether the entire width of the chopper drum 22 has already been traversed by the grinding stone 42. If this is not the case, step 128 follows in which the grinding stone 42 is traversed to the right through a distance Δx. The distance Δx corresponds preferably as a maximum to the width of the grinding stone 42, so that after a traverse of the chopper drum 22 all points of the knives 38 have been sharpened, however, it may be smaller than the width of the grinding stone 42. After step 128, step 124 again follows.

In case step 126 has determined that the entire width of the chopper drum 22 has already been traversed, step 130 follows, in which a planing is performed in a manner known in itself. Following this, the grinding stone 42 is brought into its park position in step 132 and the grinding process ends in step 134.

It should be noted that the grinding stone 42 can also be returned to the left, with steps 124 through 128 corresponding steps, however, in which the grinding stone 42 is moved to the left. The chopper drum 22 can also be traversed multiple times in the manner described. Instead of remaining stationary each time for a certain length of time, the grinding stone 42 can be driven over the width of the chopper drum 22 with a velocity varying over the width of the chopper drum 22, or moved with a varying step pattern.

Having described the preferred embodiment, it will become apparent that various modifications can be made without departing from the scope of the invention as defined in the accompanying claims.

What is claimed is:

1. In a grinding assembly, for knives of a chopper drum that is rotatable about an axis and includes a width dimension between opposite ends spaced along said axis, including a grinding stone for grinding cutting edges of said knives and a stone positioning apparatus for selectively in-feeding said grinding stone toward said chopper drum in a direction transverse to said cutting edges and for effecting reciprocable movement of said grinding stone parallel to said axis across said width dimension between first and second reversal points, respectively, adjacent said opposite ends of said chopper drum so as to sweep along said cutting edges of said knives, where said grinding stone can be controlled to dwell at said first and second reversal points so as to have longer grinding times there than at locations between said reversal points, the improvement comprising: said stone positioning apparatus including a controller operable for selectively moving said grinding stone at different speeds across different segments of said width dimension, whereby said cutting edges of the knives located within each different segment in each case can be associated with differing grinding times.

2. The grinding assembly as defined in claim 1 wherein grinding times to be associated with each different segment of said knives are predetermined and used in operating said controller.

3. The grinding assembly as defined in claim 2 wherein said controller includes a computer having a memory; and said desired grinding times respectively associated with said different segments being predetermined, with said predetermined grinding times being stored in said memory.

4. The grinding assembly defined in claim 3 wherein said controller includes a position responsive sensor which acts to control said grinding stone positioner so that said grinding stone remains standing each time at a position along said width dimension until information associated with said position identifies the predetermined grinding time associated with said position, and so that the grinding stone is subsequently moved by said grinding stone positioner further along said width dimension to a further position where the operation is repeated.

5. The grinding assembly defined in claim 1, wherein said controller includes control elements for effecting movement of said grinding stone positioner such that the latter causes said grinding stone to be moved continuously over said width dimension, but with varying velocity over at least some of said different segments of said width dimension.

* * * * *